(12) United States Patent
Kojima

(10) Patent No.: US 7,752,318 B2
(45) Date of Patent: Jul. 6, 2010

(54) METHOD OF EXCHANGING SECURED DATA THROUGH A NETWORK

(75) Inventor: Masakazu Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 892 days.

(21) Appl. No.: 10/308,004

(22) Filed: Dec. 3, 2002

(65) Prior Publication Data

US 2003/0188000 A1 Oct. 2, 2003

(30) Foreign Application Priority Data

Mar. 26, 2002 (JP) .............................. 2002-086893

(51) Int. Cl.
*G06F 15/16* (2006.01)
*G06F 12/00* (2006.01)

(52) U.S. Cl. ...................... 709/229; 709/226; 709/218; 709/227; 709/219; 709/225; 380/255; 380/282; 380/277; 380/284; 380/286; 713/155; 713/150; 713/151; 713/165; 713/156

(58) Field of Classification Search ................. 709/229, 709/228, 245, 204, 226, 218, 227, 219, 225, 709/217; 705/40, 43, 44; 707/505, 506; 713/171, 201, 168, 155, 150, 151, 165, 156; 380/255, 282, 277, 286
See application file for complete search history.

(56) References Cited

U.S. PATENT DOCUMENTS

| | | | | |
|---|---|---|---|---|
| 6,078,888 | A * | 6/2000 | Johnson, Jr. ................... 705/1 |
| 6,799,271 | B2 * | 9/2004 | Kugai .......................... 713/168 |
| 6,848,047 | B1 * | 1/2005 | Morikawa et al. ............ 713/159 |
| 6,868,402 | B1 * | 3/2005 | Hirota et al. .................. 705/40 |
| 7,051,370 | B2 * | 5/2006 | Wakino ........................ 726/30 |
| 7,093,137 | B1 * | 8/2006 | Sato et al. .................... 713/193 |
| 7,099,479 | B1 * | 8/2006 | Ishibashi et al. ............. 380/281 |
| 7,178,021 | B1 * | 2/2007 | Hanna et al. ................. 713/155 |
| 2002/0004832 | A1 * | 1/2002 | Yoon et al. ................... 709/229 |

(Continued)

FOREIGN PATENT DOCUMENTS

EP 0 921 487 A2 6/1999

(Continued)

OTHER PUBLICATIONS

Japanese Patent Office Action, mailed May 15, 2007 and issued in corresponding Japanese Patent Application No. 2002-086893.

(Continued)

*Primary Examiner*—Jude J Jean Gilles
(74) *Attorney, Agent, or Firm*—Staas & Halsey LLP

(57) ABSTRACT

A method of exchanging data stored in a server connected to a network, so that a receiving user can access the data of a sending user, including the steps of encrypting information including at least identification of an item of the data to be exchanged with the receiving user and time information in which the sending user sets the item of data accessible, receiving second information indicating at least identification of an item of the data and a time period in which the item of data becomes accessible, comparing the first information and the second information, and setting the item of the data accessible for the time period if the first information and the second information match.

13 Claims, 5 Drawing Sheets

U.S. PATENT DOCUMENTS

2002/0052921 A1* 5/2002 Morkel .................. 709/206
2002/0103765 A1* 8/2002 Ohmori .................. 705/67

FOREIGN PATENT DOCUMENTS

| EP | 1 048 998 A2 | 11/2000 |
|---|---|---|
| JP | 5-333775 | 12/1993 |
| JP | 11-205307 | 7/1999 |
| JP | 2000-311083 | 11/2000 |
| JP | 2001-282622 | 10/2001 |
| JP | 2001-282797 | 10/2001 |
| JP | 2001-318895 | 11/2001 |
| JP | 2002-505486 | 2/2002 |
| WO | 99/44161 | 9/1999 |
| WO | 01/33355 | 5/2001 |

OTHER PUBLICATIONS

Japanese Office Action for corresponding Japanese Patent Application No. 2002-0868893 dated Sep. 18, 2007.

* cited by examiner

METHOD OF EXCHANGING SECURED DATA THROUGH A NETWORK

BACKGROUND OF THE INVENTION

1. Field of the Invention

The present invention generally relates to a method of exchanging secured data through a network, and more particularly, to a simple method of exchanging data between terminals, the data being stored in a server corresponding to each terminal, through the network.

The present invention further relates to a communication terminal and a data server that are used in the above method, and a computer program that causes a computer to perform the above method.

2. Description of the Related Art

Recent developments in mobile communication technique enabled even mobile communication terminals to exchange relatively large amounts of data through a network. Since a mobile communication terminal is desired to be light and compact, it has only a limited memory resource. The data are usually stored in a memory area of a server corresponding to each mobile communication terminal. A user can control the data through the network. Each mobile communication terminal does not need a large memory capacity, and consequently, it becomes light and consumes only low power. Mobile communication terminals include, for example, cellular phones, personal data assistants (PDA), notebook computers and so forth.

The data that the user can store in a server and control through the network include personal information of a personal information manager (PIM) software, for example, and the personal information contains directory information and calendar information, for example. The user can exchange the data of PIM software using a data format such as vCard and vCalendar promoted by the Internet mail consortium (IMC).

FIG. 1 is a schematic diagram showing an exchange of data between two communication terminals through a network. Two communication terminals 10 and 20 are connected to the Internet 100 through base stations 30 and 40, respectively. The communication terminals 10 and 20 access the server 50 through the Internet 100 and manage respective PIM information 70 and 80 using the server 50. Every user is required, when accessing the server 50 from a communication terminal 10 or 20, to go through an authentication procedure in order to protect the PIM information 70 and 80 from unauthorized access. Each user can authenticate himself or herself by sending his/her user ID to the server 50.

In the case where different users exchange their PIM information stored in different servers, one user, once being authenticated, gains access to the PIM information of the other. If the one user can freely access the PIM information of the other user, however, it is difficult to secure the PIM information of the other user.

SUMMARY OF THE INVENTION

Accordingly, it is a general object of the present invention to provide a novel and useful method of exchanging data in which one or more of the problems described above are eliminated.

Another and more specific object of the present invention is to provide a relatively simple method of safely exchanging secured data stored in different servers through the network.

To achieve one of the above objects, a method of exchanging data stored in a server, according to the present invention, encrypts identification information that indicates an item of data and time information indicating a time period in which the server sets the item of data in an accessible state, then transfers the encrypted information to a receiving user of the item of data. If the receiving user transmits the encrypted information to the server storing the data therein within the time period, the server transmits the item of data to the receiving user in return.

As described above, the receiving user can access the item of data only during a designated time period and is prohibited from accessing the item of data in a time period other than the designated one, by means of setting the item of data in an accessible state during the time period designated by the sending user. Accordingly, the sending user can limit the time period in which the item of data is accessible to a minimum time period in which the receiving user requires to access the item of data. The receiving user cannot access any other item of the data but the designated item of data. As a result, there is little possibility of the receiving user accessing an item of data other than the designated one.

In the case where the encrypted information is stolen by someone in bad faith, the person is almost surely unable to obtain the item of data since the item of data is accessible for a limited time period and otherwise inaccessible.

Additionally, because both the identification information of the data and the time information of the designated time period are encrypted, the present invention can provide a method of exchanging data in which the personal data are highly secured.

Other objects, features, and advantages of the present invention will be more apparent from the following detailed description when read in conjunction with the accompanying drawings.

DETAILED DESCRIPTION OF THE PREFERRED EMBODIMENTS

The preferred embodiments of the present invention will be described in detail below.

Figure 1:
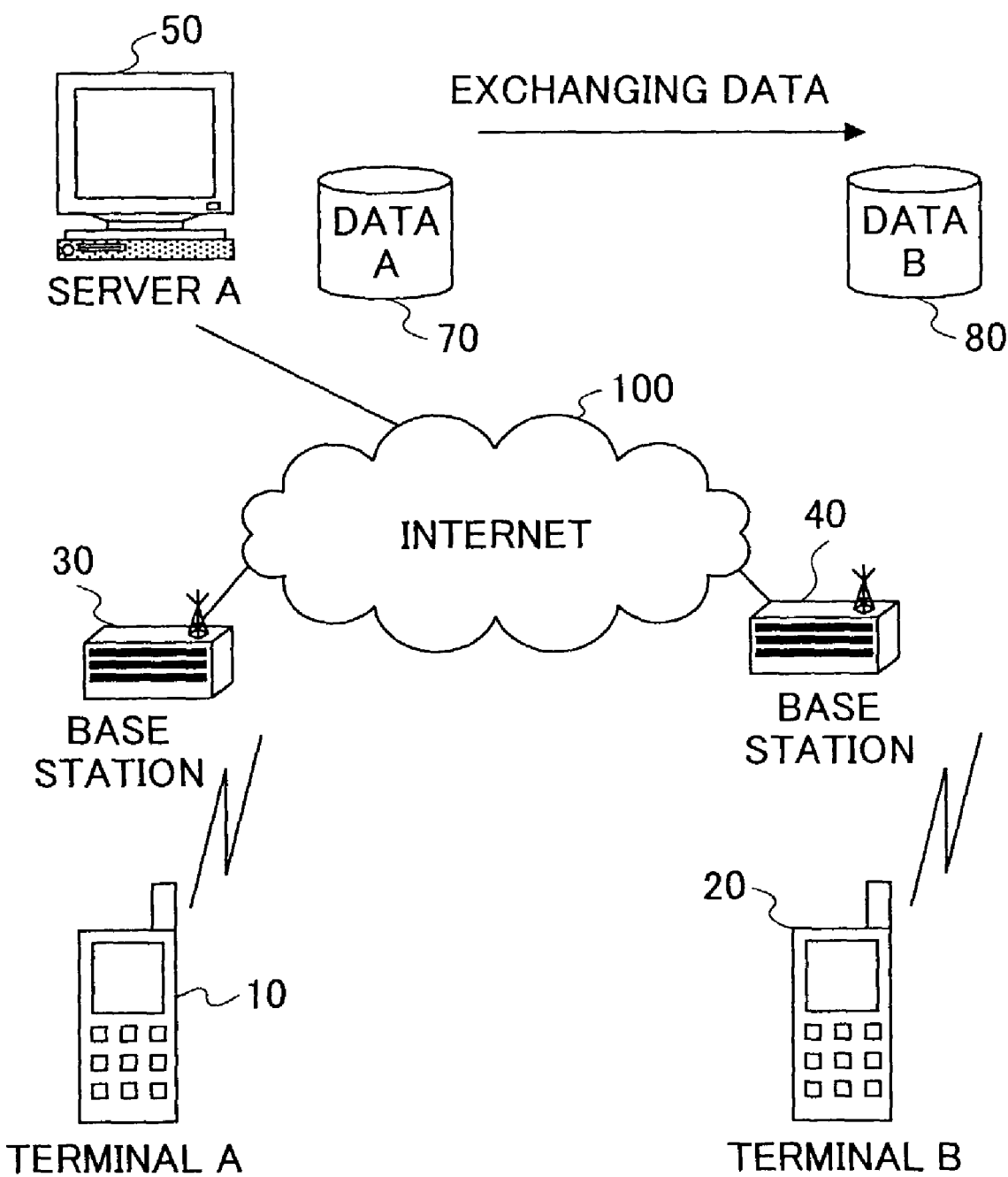
FIG. 1 is a schematic diagram showing how data are exchanged by two communication terminals through a network.
Figure 2:
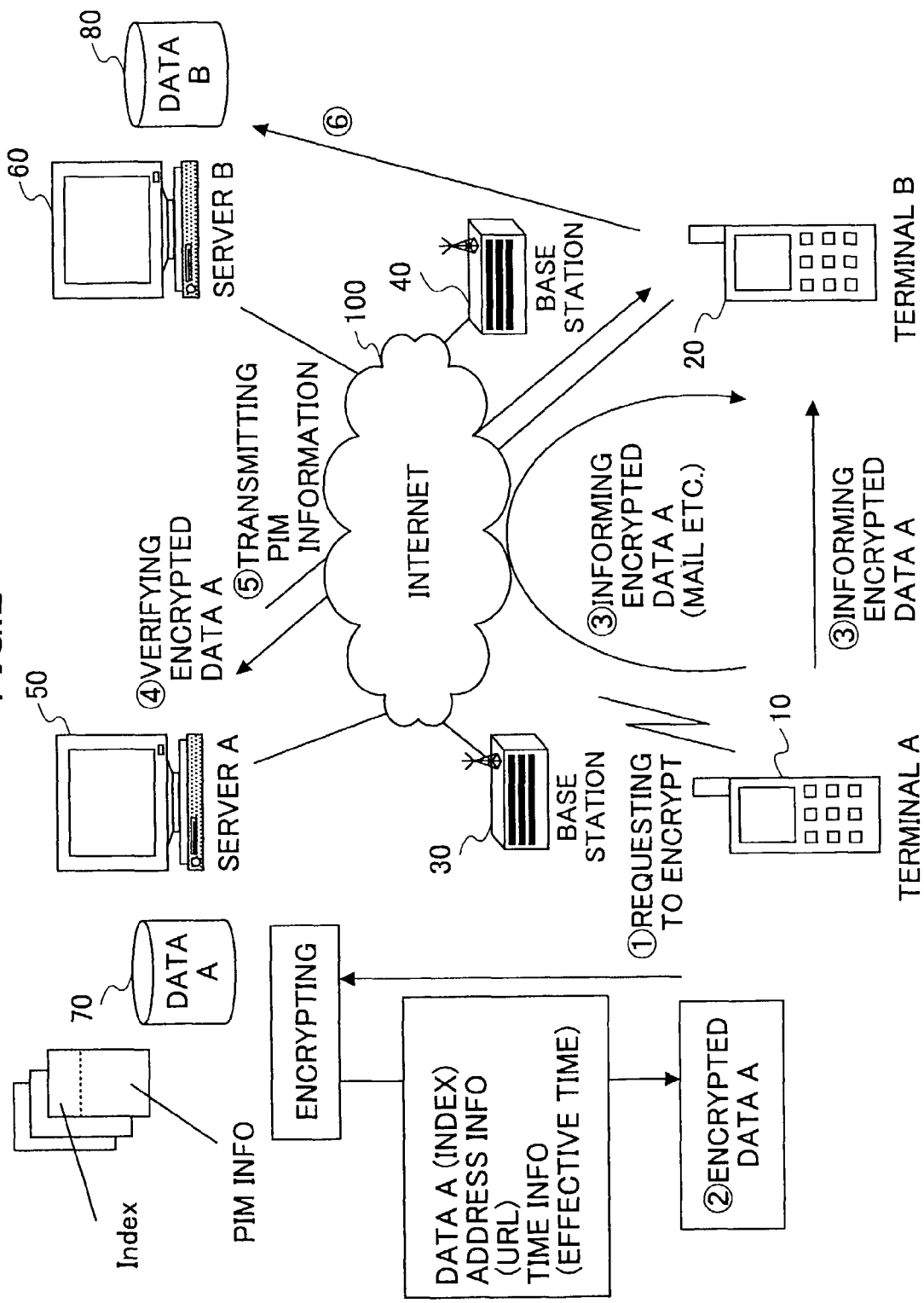
FIG. 2 is a schematic diagram showing how data are exchanged, according to the first embodiment of the present invention, by two communication terminals through the network.

FIG. 2 is a schematic diagram showing how data are exchanged by two communication terminals based on the first embodiment of the present invention. The configuration showed in FIG. 2 is basically the same as that described above by reference to FIG. 1. That is, the communication terminals 10 and 20 of different users are connected to the Internet 100, and the PIM information 70 and 80 of the users is exchanged.

In this case, what is different from the configuration showed in FIG. 1 is that the respective PIM information 70 and 80 are stored in different servers 50 and 60. The user of the terminal 10 is authenticated by the server 50, and the user of the terminal 20 is authenticated by the server 60. The user of the terminal 20 does not have user authentication of the server 50 so that this user cannot access the PIM information 70 of the user of the terminal 10 as it stands.

In the following description, the PIM information 70 and 80 are assumed to be business card information in the vCard data format of the users. That is, the user of the terminal 10 holds business card information of a plurality of people, and the user of the terminal 20 has business card information of another plurality of people. The case where the user of the terminal 20 accesses the server 50 to obtain the business card information of the terminal 10 user from the PIM information 70 and adds the business card information to his/her business card information contained in the PIM information 80 stored in the server 60 will be considered.

Figure 3:
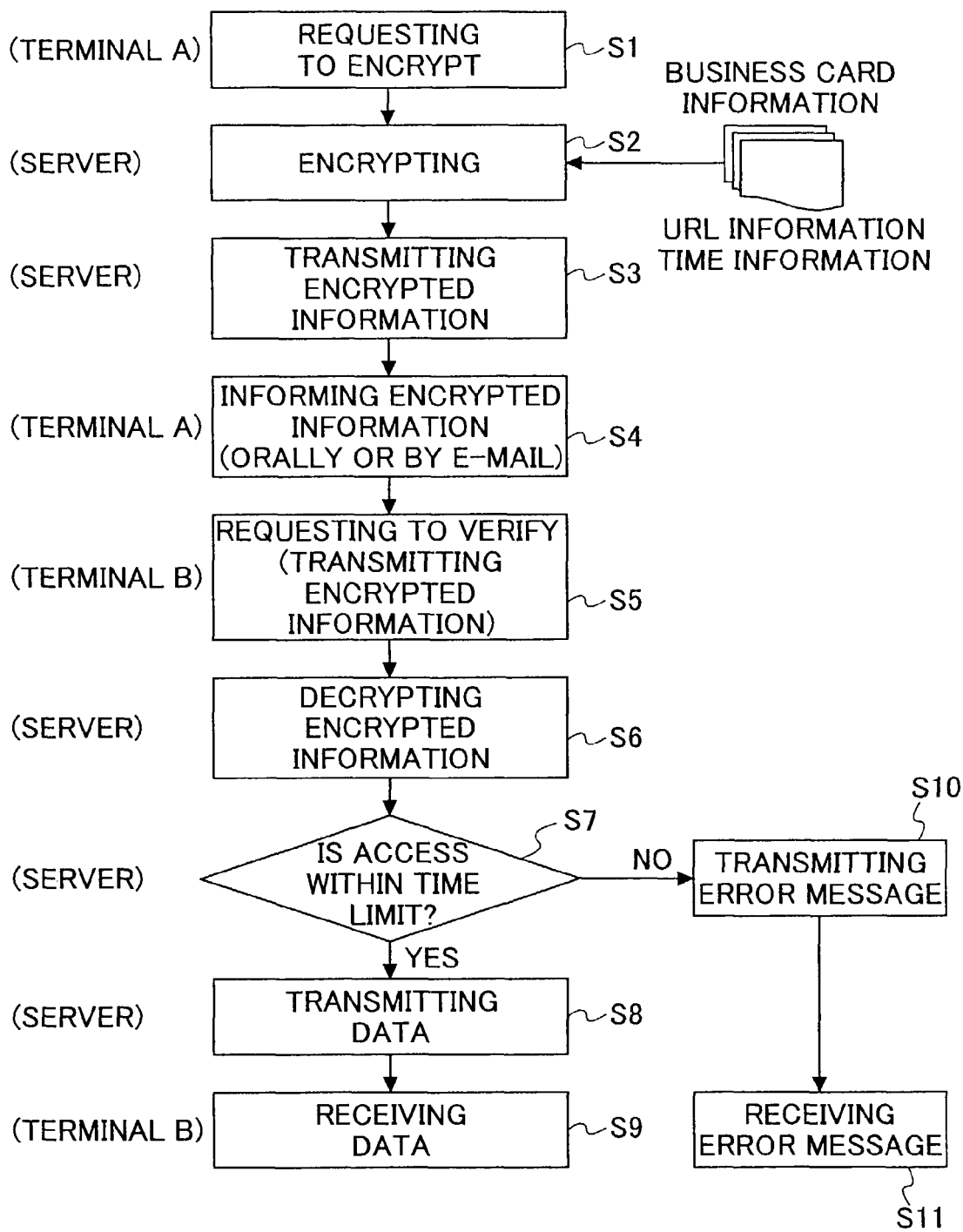
FIG. 3 is a flow chart showing a method of exchanging data according to the first embodiment.

In the flow chart showed in FIG. 3, the terminal 10 user gives an instruction to encrypt information that "my business card information becomes accessible for 10 minutes from now (for example, up to 15:10)" to the server 50, which is under the control of the terminal 10 user, using the terminal 10 (step S1).

In response to this instruction, the server 50 encrypts "its network address (for example, http://www.xyz.com)", "the index of the business card information of the terminal 10 user (for example, 001)", and "time period in which the business card information is accessible (for example, if it's 15:00, then 15:10)" and as a result, obtains encrypted data XXX-YYYZZZ (hereinafter referred to as encrypted data A) (step S2). The server 50 returns this encrypted data A to the terminal 10 (step S3).

In response to reception of the encrypted data A, the user of the terminal 10 informs the user of terminal 20 of the encrypted data A (step S4). In an embodiment, the terminal 10 user may give a call to the terminal 20 user to orally communicate the encrypted data A. In another embodiment, the terminal 10 user may transmit an e-mail message containing the encrypted data A to the terminal 20 user.

The terminal 20 user, in response to the reception of the information, can input the encrypted data A to his/her terminal 20. In an embodiment, the terminal 20 user may input the encrypted data A by pressing buttons provided on the terminal 20. In situations where the encrypted data A are transmitted as an e-mail message, the terminal 20 user may input the encrypted data A by a cut-and-paste operation, for example. The terminal 20 user decrypts the encrypted data A using a software program implemented in the terminal 20 beforehand to obtain the address information (that is, the address of the server 50: http://www.xyz.com), and transmits the encrypted data A to the entity indicated by the address, that is, the server 50 (step S5).

In response to reception of the encrypted data A (returned encrypted data A) transmitted by the terminal 20, the server 50 compares it with the one (original encrypted data A) that the server 50 transmitted to the terminal 10. If the returned encrypted data A matches the original encrypted data A, the server 50 decrypts the encrypted data A, and makes the business card information of the terminal 10 user (indicated by the index 001) accessible for the designated time period (until 15:10, in this case) in compliance with the information (step S7). If the server 50 receives the returned encrypted data A before 15:10 (Yes branch of step S7), the server 50 transmits the business card information of the terminal 10 user to the terminal 20 (step S8). As a result, the terminal 20 user can obtain the business card information of the terminal 10 user (step S9). The terminal 20 user can add the business card information of the terminal 10 user, as obtained in this manner, to his/her business card information 80 stored in the server 60.

If the server 50 receives the returned encrypted data A after the designated time limit, 15:10 in step S6, the server 50 rejects the access and returns an error message to the terminal 20 (step S10). The terminal 20 receives the error message (step S11).

As described above, according to the first embodiment, the address information (URL, for example) and the accessible time period are encrypted as well as the index information as identification information of the business card information. The server 50 transmits the encrypted data A to the terminal 10 user. In response to reception of the returned encrypted data A, the server determines whether it matches the original encrypted data A that were transmitted to the terminal 10 user. If the returned one matches the original one, the server 50 makes the PIM information of the terminal 10 user accessible only for the designated time period indicated by the encrypted data.

Even if the receiving user can access the PIM information of the sending user, that does not mean the receiving user has obtained user authentication from the server of the sending user. The receiving user cannot access the PIM information of the sending user after the designated time. Accordingly, the sending user can effectively reduce the risk that the PIM information, stored in the server of the sending user, other than the PIM information designated by the index information, is accessed by the receiving user.

In the case where the encrypted data are known by someone else, and that one attempts to access the PIM data using the encrypted data, if it has passed the designated time, that one cannot access the PIM data stored in the server of the sending user. The present invention assures the sending user of a high security level.

It is desired that the address information (URL) of the server 50 not be displayed, when the encrypted data A are decrypted by the software program implemented in the terminal 20 in step S5, in the display of the terminal 20. That means the receiving user cannot know the address information of the server of the sending user, which ensures the sending user an even higher security level.

If the sending user keys in the encrypted data to the receiving user's terminal or transmits it to the receiving user's terminal as an e-mail message and so forth, without telling it to the receiving user orally, the sending user can surely avoid the leak (unintended disclosure) of the encrypted data.

Figure 4:
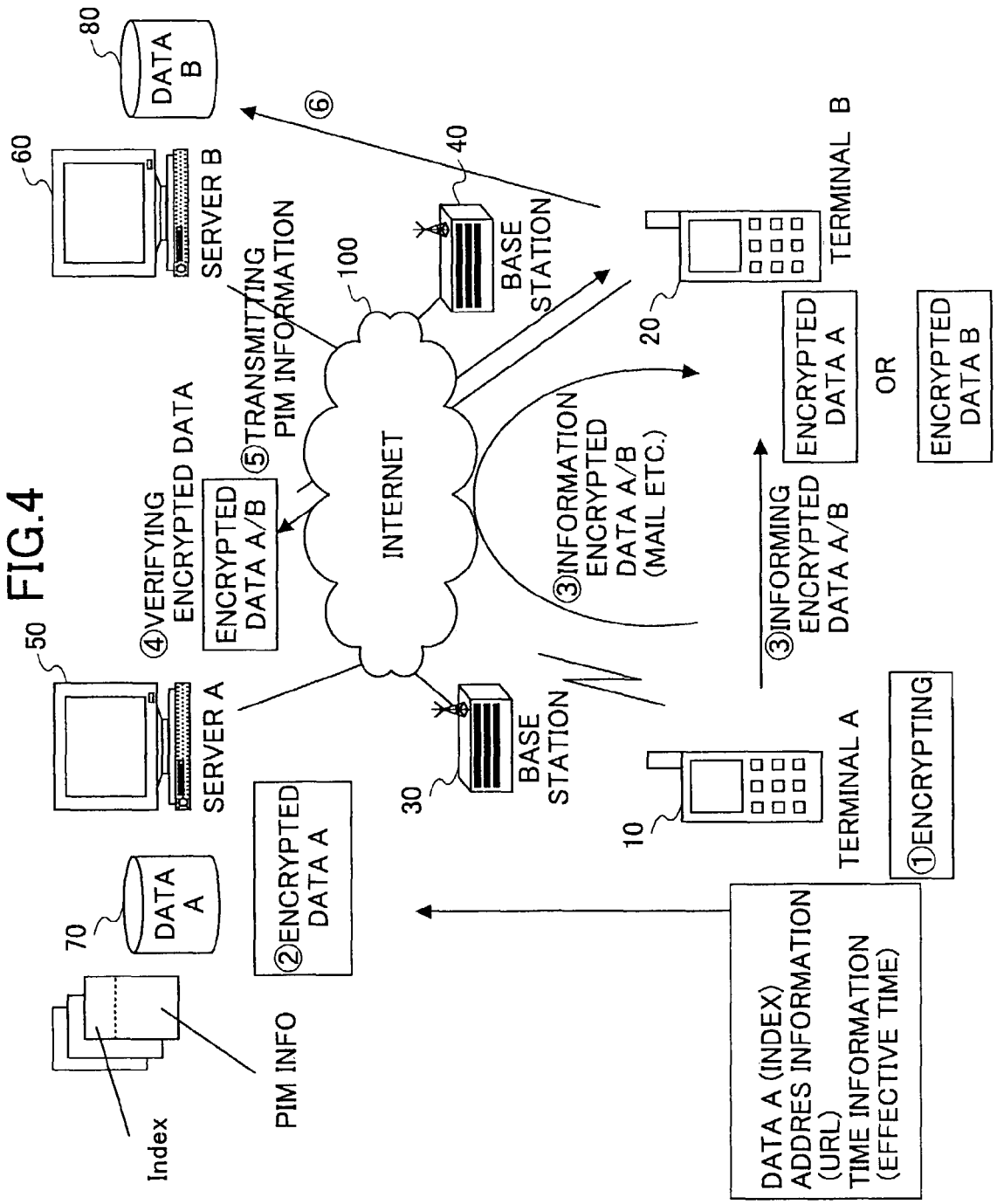
FIG. 4 is a schematic diagram showing how data are exchanged, according to the second embodiment of the present invention, by two communication terminals through a network.
Figure 5:
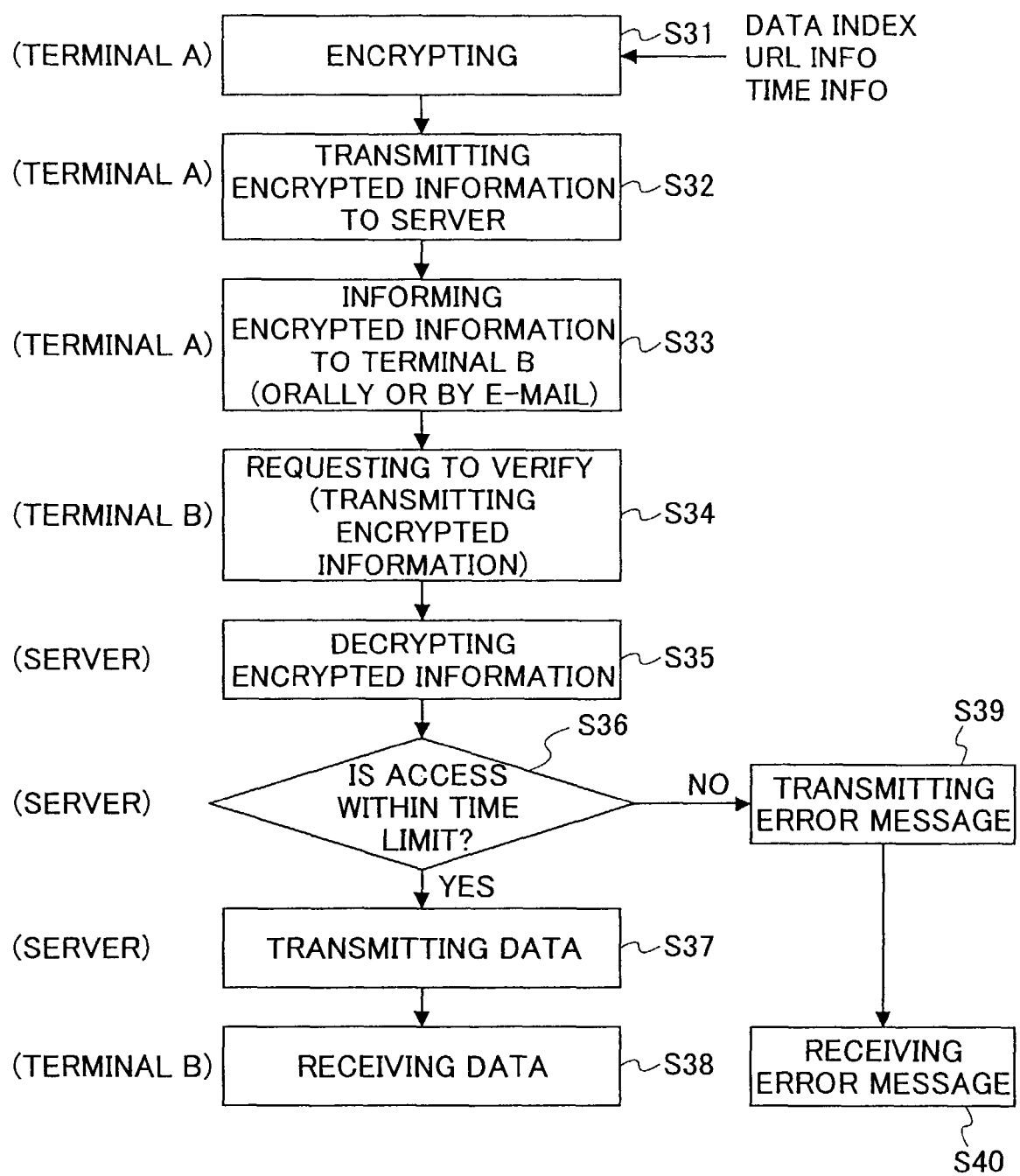
FIG. 5 is a flow chart showing a method of exchanging data according to the second embodiment.

The second embodiment of the present invention will be described in detail by reference to FIGS. 4 and 5.

The terminal 10 user inputs an instruction to the terminal 10 to encrypt information that his/her business card information is set accessible for 10 minutes (until 15:10, for example) from now. In response to this instruction, the terminal 10 encrypts information such as "the address of the server 50 (for example, http://www.xyz.com)", "the index of the user's business card information (for example, 001)", and "time period in which the business card information corresponding to the above index is set accessible (for example, until 15:10)" as encrypted data XXXYYYZZZ (hereinafter, referred to as encrypted data A) (step S31). The encrypted data A are transmitted from the terminal 10 to the server 50 (step S32).

In addition, the terminal 10 user transfers the encrypted data A to the terminal 20 user (step S33). The transfer may be performed orally, via phone conversation, or by e-mail.

In response to the transfer of the encrypted data A, the terminal 20 user inputs the encrypted data A to set the terminal 20. In this case, the terminal 20 user can input the encrypted data A by pressing keys provided on the terminal 20. In the case where the encrypted data A are transferred via e-mail, the terminal 20 user can set the terminal 20 by "cutting & pasting" the encrypted data A. The terminal 20 decrypts the address information of the server 50 (http://www.xyz.com) by activating a software program installed in the terminal 20 beforehand, and transmits the encrypted data A to the address in the Internet, that is, the server 50 (step S34).

In response to reception of the encrypted data A, the server 50 compares the encrypted data transmitted by the terminal 20 (returned encrypted data A) with the encrypted data transmitted by the terminal 10 in step 32 (original encrypted data A). If the returned encrypted data A matches the original encrypted data A, the, server 50 decrypts the encrypted data A, and sets the terminal 10 user's business card information (index 001) in accessible state for the time period until 15:10 in this case in accordance with the information contained in the encrypted data A (step S36). If the time at which the server 50 receives the encrypted data A is, for example, 15:05, which is before the above designated time, 15:10 in this case (Yes branch of step S36), the server 50 sends the business card information of the terminal 10 user to the terminal 20 (step S37). As a result, the terminal 20 user can obtain the business card information of the terminal 10 user by operating the terminal 20 (step S38).

If the time at which the server 50 receives the returned encrypted data A is after the designated time, 15:10 (No branch of step S36), the server 50 does not allow the terminal 20 to access the business card information of the terminal 10 user and returns an error message to the terminal 20 (step S39). The terminal 20 receives the error message transmitted by the server 50 (step S40).

Another variation of the second embodiment will be described below. It is determined that the information transferred from the terminal 10 user to the terminal 20 user at the step S33 in FIG. 5 is encrypted data B different from the encrypted data A itself. In this case, however, the encrypted data B includes the same address information of the server 50 and the same index information of the business card information as the encrypted data A, but includes the time information different from that of the encrypted data A. In encrypted data B, the time period is indicated as "accessible until 15:05" for example. The terminal 10 encrypts the information such as "the address information of the server 50 (http://www.xyz.com, for example)", "the index of the user's business card information (001, for example)", and "the time limit information until which the business card information of the above index is accessible (until 15:05, in this case)", and obtains the encrypted data B. The terminal 10 user transfers the encrypted data B to the terminal 20 user (step S33).

In response to reception of the encrypted data B, the terminal 20 user input the encrypted data B into the terminal 20. As a result, the terminal 20 decrypts the address information contained in the encrypted data B (the address of the server 50, http://www.xyz.com) using a software program implemented in the terminal 20 beforehand, and transmits the encrypted data B to the place in the Internet indicated by the address information, that is, the server 50 (step S34).

The server 50, in response to reception of the encrypted data B, decrypts the encrypted data B and compares the content of the encrypted data B with the content of the encrypted data A obtained by decrypting the encrypted data A received from the terminal 10 in step S32. As a result, if the designated index of the business card information matches and the designated time is within the range of the encrypted data A, the server 50 sets the user's business card information of the designated index 001 accessible until the designated time, 15:05 in accordance with the instruction of the terminal 10 user (step S36).

If the server 50 receives the encrypted data B before the designated time limit 15:05 (Yes branch of step S36), the server 50 transmits the business card information of the terminal 10 user to the terminal 20 (step S37). As a result, the terminal 20 user can access the business card information of the terminal 10 user by operating the terminal 20 (step S38).

In the time at which the server 50 receives the encrypted data B at step S35 has passed the designated time, 15:05, (No branch of step S36), the server 50 rejects the access from the terminal 20 and returns an error message to the terminal 20 (step S39). The terminal 20 receives the error message (step S40).

According to the second embodiment, compared to the first embodiment, since the user of the terminal 10 can omit the step (step S1) of requesting the server 50 to encrypt the information, the user can save time and reduce expenses. Furthermore, as described by another variation of the second embodiment, the terminal 10 can create mutually different encrypted data for the server 50 and the terminal 20. As a result, the user of the terminal 10 can designate the server 50 to accept the access from the terminal 20 for a relatively long time period (encrypted data A), and the user of the terminal 20 to access the server 50 within relatively short time period (encrypted data B). Accordingly, the user of the terminal 10 can limit time in which the business card information is set accessible to the minimum extent. The method of exchanging secured data can provide even higher security level.

The present invention is not limited to these embodiments, but various variations and modifications may be made without departing from the scope of the present invention. For example, in the above embodiments, the server 50 sets the user's information accessible in response to reception of predetermined encrypted data during a designated time period. In another embodiment, the server 50 may only transmit the user's information in response to reception of the encrypted data during the designated time period without setting the user's information accessible for a designated time period. To the contrary, the server 50 can only set the user's information accessible for a designated time period in response to reception of the encrypted data during a certain time period without transmitting the designated item of the user's information. In this case, the user of the terminal 20 can fetch the designated item of the user's information during the designated time period.

Additionally, in the above embodiment, the designated time period is supposed to start at the time of encryption. In another embodiment, the designated time period in which the user's information becomes accessible may start at a certain time after the encryption and end at the designated time.

That is, since the sending user can designate and limit time in which the server makes the information item of the sending user accessible for the receiving user, the sending user needs to pay attention to the security protection of the information only during the designated time period. It is desired that the method be configured so that the sending user does not need to pay any attention to the security of the information after the designated time has passed.

As described above, the method of exchanging secured data through a network, according to the present invention, is configured so that the encrypted information containing the data identification information and the time information in which the data becomes accessible is transferred to the receiving user, and the server that receives the encrypted data from the terminal of the receiving user sets the exchanging data accessible. Accordingly, the present invention can provide a method of exchanging secured data through the network with relatively simple configuration but with high security level.

This patent application is based on Japanese priority patent application No. 2002-086893 filed on Mar. 26, 2002, the entire contents of which are hereby incorporated by reference.

What is claimed is:

1. In a server connected to a network, a method of providing an access to unencrypted data stored therein, comprising:
   encrypting access information including at least identification of the unencrypted data and a time period in which the data is set accessible;
   sending the encrypted access information to a first terminal;
   receiving from a second terminal a request for accessing the unencrypted data with the encrypted access information;
   verifying the encrypted access information received from the second terminal by comparing the encrypted access information received from the second terminal with the encrypted access information sent to the first terminal; and
   setting the unencrypted data accessible for the time period and allowing the second terminal to access the unencrypted data without authenticating the second terminal if the encrypted access information received from the second terminal is determined valid as a result of the verifying.

2. The method as claimed in claim 1, further comprising sending the data set accessible to the second terminal.

3. The method as claimed in claim 2, wherein the encrypted access information sent to the first terminal is transferred to the second terminal via e-mail.

4. The method as claimed in claim 1, wherein
   in the verifying the encrypted access information, if identification of the data contained in the encrypted access information received from the second terminal matches the identification of the data, and the time period contained in the encrypted access information received from the second terminal is included in the time period, the encrypted access information received from the second terminal is determined valid.

5. The method as claimed in claim 1, wherein
   in the encrypting of the access information, location information of the server is encrypted as a part of the access information; and
   the second terminal decrypts the location information of the server and sends the request for accessing the data to the server corresponding to the location information.

6. A communication terminal that can provide an access to unencrypted data stored in a server connected to a network, comprising:
   an encryption unit that encrypts access information including at least identification of the unencrypted data and a time period in which the unencrypted data is set accessible;
   a server transmission unit that transmits the encrypted access information by the encryption unit to the server; and
   an inter-terminal transmission unit that transmits the encrypted access information by said encryption unit to another communication terminal that requests access to the unencrypted data,
   wherein, in response to receipt from the other terminal of a request for accessing the unencrypted data with encrypted access information, the server verifies the encrypted access information received from the other terminal by comparing the encrypted access information received from the other terminal with the encrypted access information encrypted by the encryption unit, and sets the unencrypted data accessible for the time period and allows the other communication terminal to access the unencrypted data without authenticating the other communication terminal if the encrypted access information received from the other terminal is determined valid as a result of the verification.

7. A server that stores and provides an access to unencrypted data stored therein, comprising:
   an encryption unit that encrypts access information including at least identification of the unencrypted data and a time period in which the unencrypted data is set accessible;
   a receiving unit that receives, from a second terminal, a request for accessing the unencrypted data with the encrypted access information;
   a verification unit that verifies the encrypted access information received from the second terminal by comparing the encrypted access information received from the second terminal with the encrypted access information encrypted by the encryption unit; and
   a setting unit that sets the unencrypted data accessible for the time period and allows the second terminal to access the unencrypted data without authenticating the second terminal if the encrypted access information received from the second terminal is determined valid as a result of the verification.

8. A non-transitory computer memory storing a program which when executed causes a computer of a communication terminal to perform a method comprising:
   encrypting access information including at least identification information of unencrypted data and a time period in which the unencrypted data is set accessible;
   transmitting the encrypted access information to a server; and
   transmitting the encrypted access information to another communication terminal that requests an access to the unencrypted data wherein, in response to receipt from the another terminal of a request for accessing the unencrypted data with the encrypted access information, the server verifies the encrypted access information received from the other terminal by comparing the encrypted access information received from the another communication terminal with the encrypted access information in the communication terminal, and sets the unencrypted data accessible for the time period and allows the another communication terminal to access the unencrypted data without authenticating the another communication terminal if the encrypted access information received from the other terminal is determined valid as a result of the verification.

9. A non-transitory computer memory storing a program which when executed causes a computer of a server to perform a method comprising:
   encrypting access information including at least identification of unencrypted data and a time period in which the unencrypted data is set accessible;
   receiving from a second terminal a request for accessing the unencrypted data with the encrypted access information;
   verifying the encrypted access information received from the second terminal by comparing the encrypted access information received from the second terminal with the encrypted access information; and setting the unencrypted data accessible for the time period and allowing the second terminal to access the unencrypted data without authenticating the second terminal if the encrypted access information received from the second terminal is determined valid as a result of the verification.

10. In a communication terminal connected to a network, a method of providing an access to unencrypted data stored in a server, comprising:

encrypting access information including at least identification of the unencrypted data and a time period in which the unencrypted data is set accessible;

sending the encrypted access information to the server;

sending the encrypted access information to a second communication terminal that requests the server for access to the unencrypted data, wherein, in response to receipt from the second terminal of a request for accessing the unencrypted data with the encrypted access information, the server verifies the encrypted access information received from the second terminal by comparing the encrypted access information received from the second communication terminal with the encrypted access information in the server, and sets the unencrypted data accessible for the time period and allows the second communication terminal to access the unencrypted data without authenticating the second communication terminal if the encrypted access information received from the second terminal is determined valid as a result of the verification.

11. The method as claimed in claim 10, wherein, if the identification of the data contained in the encrypted access information received from the second terminal matches the identification of the data, and the time period contained in the encrypted access information received from the second terminal is included in the time period, the encrypted access information received from the second terminal is determined valid.

12. The method as claimed in claim 10, wherein, in the encrypting of the access information, location information of the server is encrypted as a part of the access information; and the second terminal decrypts the location information of the server and sends the request for accessing the data to the server corresponding to the location information.

13. A method, comprising:

encrypting access data in a server having a processor, the access data used to retrieve other unencrypted data stored on a storage medium in the server and including a network address of the server, a data index, and a time period;

allowing a mobile terminal to retrieve the other unencrypted data from the server by verifying the encrypted access data with the server using the processor without authenticating the mobile terminal if a current time is within the time period.

* * * * *